United States Patent [19]
Elvin et al.

[11] Patent Number: 5,225,169
[45] Date of Patent: Jul. 6, 1993

[54] REDUCED HEAT LOSS SULFIDER

[75] Inventors: Frank J. Elvin, Houston, Tex.; Lloyd K. Whittington, Ponchatoula, La.

[73] Assignee: Coastal Catalyst Technology, Inc., Houston, Tex.

[21] Appl. No.: 690,867

[22] Filed: Apr. 23, 1991

[51] Int. Cl.$^5$ .......................... F28D 13/00; B01J 8/18; H01C 1/024

[52] U.S. Cl. .................... 422/146; 422/199; 422/241; 422/307; 373/37; 373/96; 338/233; 338/334

[58] Field of Search ............... 422/139, 146, 241, 240, 422/307, 199, 7, 109; 373/36, 37, 52, 54, 55, 72, 94–96; 338/232–234, 236, 237, 226, 230, 243, 244, 245, 246; 264/40.4; 165/177, 179, 180, 181, 183; 405/157

[56] References Cited

U.S. PATENT DOCUMENTS

| | | | |
|---|---|---|---|
| 2,762,693 | 9/1956 | Hepp | 422/241 X |
| 2,858,403 | 10/1958 | Butler, Jr. | 338/233 X |
| 3,067,005 | 12/1962 | Nelson et al. | 422/146 X |
| 3,753,661 | 8/1973 | Simons | 422/109 X |
| 4,457,002 | 6/1984 | Mathgen et al. | 373/95 |
| 4,555,249 | 11/1985 | Leas | 422/142 X |
| 4,686,197 | 8/1987 | Elvin | 502/22 |
| 4,781,565 | 11/1988 | Sanvorjo | 422/241 X |
| 4,800,185 | 1/1989 | Elvin et al. | 502/26 |
| 4,806,512 | 2/1989 | Elvin | 502/65 |
| 4,824,814 | 4/1989 | Elvin et al. | 502/22 |
| 4,828,684 | 5/1989 | Elvin | 208/251 |
| 4,932,810 | 6/1990 | Austin | 405/157 |

Primary Examiner—Robert J. Warden
Assistant Examiner—E. Leigh Dawson
Attorney, Agent, or Firm—Browning, Bushman, Anderson & Brookhart

[57] ABSTRACT

An improved sulfider is provided for receiving high temperature catalysts from a hydrocarbon cracking operation and subjecting the catalyst to a sulfur-containing gas. The treating unit includes an outer metal housing and first refractory layer within the metal housing for minimizing heat loss from the treatment unit. A second refractory layer is provided within the first refractory layer and defines an interior chamber within the treatment unit, and a plurality of heating units are spaced circumferentially along the interface of the first and second refractory layers. The heating units substantially minimize the temperature differential across the second refractory layer and thereby minimize the heat loss from the high temperature catalyst within the chamber. The catalyst is continually passed into and out from the chamber, and the sulfur-containing gas is injected into a lower portion of the chamber to pass through the high temperature bed formed by the catalyst. The second refractory layer substantially minimizes contact between the sulfur-containing gas and the plurality of heating units, and the outer metal wall of the sulfider may be maintained at a relatively cool temperature. An inert gas may be passed to each of the plurality of heating units to further minimize the corrosion of the heating units.

15 Claims, 2 Drawing Sheets

REDUCED HEAT LOSS SULFIDER

FIELD OF THE INVENTION

The present invention relates to equipment and techniques for minimizing heat loss from a process chamber containing a corrosive or otherwise deleterious fluid. More particularly, the invention relates to sulfider equipment and techniques for treating heated, contaminated catalyst useful for cracking hydrocarbon feedstocks with elemental sulfur vapors, while both minimizing heat loss from the sulfider and substantially increasing the useful life of the sulfider.

BACKGROUND OF THE INVENTION

Various processes require that a material be treated at an elevated temperature with a fluid. This treatment may occur at a high temperature provided by the incoming material, which may be continually input and removed from the equipment in a continuous flow-through process rather than a batch process. In some treatment processes, it is important that the heat loss from the incoming material be minimized. The treatment system envisioned by this invention is substantially complicated by the fact that the treating fluid is highly deleterious to the desired housing material for the process chamber, at least at the elevated temperatures at which the treatment is occurring.

Those skilled in the cracking of hydrocarbon feedstock have long recognized the value of various solid catalyst to yield more valuable end products. These catalysts typically may be manufactured from various synthetic crystalline materials, and are utilized in powder form with particle sizes ranging from 1 to 100 microns. The solid catalyst become contaminated or poisoned by "metals" during the hydrocarbon conversion, with the term "metals" referring to contaminants in the form of either free metals or relatively non-volatile compounds. U.S. Pat. No. 3,140,253 and U.S. Pat. No. Re. 27,639 generally disclose techniques for preparing a suitable catalyst for cracking hydrocarbon feedstocks.

Various techniques have been devised for removing metals from the hydrocarbon conversion catalyst so that the catalyst can be returned to the cracking operation. One commonly used technique is to chlorinate a contaminated catalyst at elevated temperatures. According to the technique described in detail in U.S. Pat. No. 4,686,197, the contaminated catalyst is demetalized by contacting the catalyst with at least one chlorine-containing component. Chlorination can be effective to remove vanadium from the catalyst, and also for placing nickel poisons into a form soluble in an aqueous solution. After chlorination and washing, the demetalized catalyst may then be returned to a fluid bed reactor vessel for cracking hydrocarbons.

As disclosed in the '197 patent, contaminated catalyst from the fluid bed catalytic cracking operation may be passed through an initial sulfiding process for enhancing the removal of nickel and vanadium during the subsequent chlorination and washing processes. During the sulfiding step, the poisoned catalyst is contacted with elemental sulfur vapors, such as $H_2S$. According to the prior art, this sulfiding step is preferably performed in an in-line or continuous flow-through process by passing the heated catalyst into a sealed reactor having metal walls. $H_2S$ is introduced into the bottom of the reactor and passed upward through the fluid bed formed by the catalyst. Although the sulfiding process preferably occurred at temperatures above 1200° F., it is difficult to maintain the catalyst at this temperature, even if the walls of the metal reactor are covered with a reasonable layer of insulation.

At temperatures in excess of 800° F., $H_2S$ becomes highly corrosive to most metals, and thus corrosion of the sulfider walls substantially limited the expected life of the sulfider. In an effort to try to raise the temperature of the sulfiding operation, heaters were placed external of and in physical contact with the metal sulfider walls, with the insulation layer then being placed outward of the heaters. Although this procedure had the desired effect of reducing the heat loss from the catalyst during the sulfiding process, it had the undesirable effect of further increasing the corrosion of the stainless steels walls which formed the sulfider, and accordingly further reduced the life of the sulfider. Utilizing the above technique, it has been found that a sulfider with one-half inch stainless steel walls had a wall reduction of approximately 50% after operating the sulfider for approximately six to eight months, and that the integrity of the remaining thickness of the wall was such that the sulfider effectively had to be rebuilt. The maintenance and construction of the sulfiders is thus a significant cost of the overall catalyst demetalization process, and improved methods and techniques are therefore required to enhance the life of the sulfider and lower the overall process of demetalizing the catalyst.

The disadvantages of the prior art are overcome by the present invention, and improved methods and apparatus are hereinafter disclosed for substantially minimizing heat loss from the treatment process which includes a corrosive gas or liquid deleterious to the material of the treatment housing at the elevated temperatures. The techniques of the present invention are particularly well suited for manufacturing an improved sulfider used in hydrocarbon cracking operations to assist in demetalizing catalysts by subjecting the contaminated catalyst to a sulfur-containing gas.

SUMMARY OF THE INVENTION

According to the concepts of the present invention, heat loss from the treatment operation is substantially minimized by placing heating units inside the metal container walls which provide the sealed housing for the treated material and the treatment fluid. A first refractory layer is used between the metal walls and the heating units to minimize heat loss from the unit, and a second interior refractory layer is employed between the heating units and a chamber interior of the second refractory layer in which the treatment operation occurs to substantially minimize heat loss from the treated material. Since the heating units do not actually provide heat to the chamber but rather substantially minimize heat loss by reducing the temperature differential across the second refractory layer, the heating units may be operated at a temperature less than that of the chamber itself. The second interior refractory layer acts as a barrier to minimize contact of the heating units by the treatment fluid. The heating units may comprise a plurality of elongate tubes spaced circumferentially around the annulus between the chamber and the metal walls, with each tube having an interior electrically heated rod therein. The annulus between each tube and its respective rod may be maintained at a positive pressure with respect to the pressure within the chamber, so that any leakage through a tube will not allow the treatment fluid to contact the heating rod.

According to a preferred embodiment of the present invention, the heating units are circumferentially positioned about an interior surface of the first poured refractory layer, and brick forms the second refractory layer. The treated material is contaminated or poisoned solid catalyst in particulate form from a fluid bed reactor vessel of a hydrocarbon cracking operation, and the treating fluid is a sulfur containing gas, such as hydrogen sulfide. The catalyst is input at approximately 1550° F., and the outer surface of the sulfider treatment chamber, which is the inner surface of the brick layer, is maintained at approximately 1500° F. The heating rods are operated at a temperature of about 1300° F., so that a relatively small temperature differential of approximately 200° F. exists across the second refractory layer, and accordingly a relatively small amount of heat is lost from the sulfider treatment chamber. The first refractory layer lowers the temperature of the metal housing to approximately 200° F., so that this housing is maintained at a relatively cool temperature compared to prior art sulfiders. If no heating rods were provided, the metal housing wall would desirably be cooler than according to the present invention, but the heat loss which occurs would undesirably be from the catalyst, while according to the present invention most of the lost heat is generated by the heating rods.

The temperature of the metal housing is such that the $H_2S$ gas, even if it contacts this housing, does not cause substantial corrosion of the housing, thereby substantially enhancing the life of the sulfider. The inner refractory brick layer substantially minimizes the amount of hydrogen sulfide gas which comes into contact with the tubes for the heating rods, thereby substantially enhancing the life of these rods. Moreover, since the rods may be maintained at approximately 1300° F., the corrosive affects of the hydrogen sulfide gas are minimized. By applying a positive pressure to the chamber between each of the heating rod tubes and the heating rods, the likelihood of hydrogen sulfide gas contacting the rods is eliminated or substantially reduced. According to the concepts of the present invention, the sulfidizing treatment process occurs at a desired temperature of approximately 1500° F., yet the life of the sulfider unit is substantially increased such that several years of operation can be expected from a unit. In view of the substantially lower temperature to which the walls of the sulfider are subjected, the sulfider walls themselves may be manufactured from a lower cost carbon steel rather than stainless steel material, which was commonly used in prior art sulfiders.

It is an object of the present invention to provide a high temperature treatment unit which will minimize heat loss from a treated material subjected to a treatment fluid which is deleterious to the housing of the unit, while substantially enhancing the life of the unit walls by minimizing contact between the unit walls and the treatment fluid, and by substantially reducing the temperature of the walls and therefore the reaction temperature between any treatment fluid and the walls.

It is a further object of this invention to provide a treating unit for minimizing heat loss from a heated material treated with a fluid within the unit treating chamber, with the treating unit having metal housing walls, a plurality of heating units positioned within the metal walls, a first refractory material layer between the metal walls and a plurality of heating units, and a second refractory layer between the heating units and an interior treatment chamber.

It is a feature of the present invention to provide an improved sulfider for treating contaminated catalysts from a hydrocarbon cracking operation by subjecting the catalyst to a sulfur-containing gas, and both minimizing heat loss from the catalyst and substantially enhancing the life of the sulfider.

It is another feature of this invention to provide sulfider for a high temperature treatment operation, the sulfider having metal housing wall, a first refractory layer within the housing, a plurality of heating units circumferentially adjacent an inner surface of the first refractory layer and operated at a temperature less than that of the catalyst within the sulfider, and a second refractory layer interior of the first refractory layer for defining the treatment chamber.

It is an advantage of the present invention that the second inner refractory layer may be economically formed from brick.

It is another advantage of the invention that the heating units are electrically heated rods each within a heating tube, and that the annulus between each rod and its respective tube is maintained at a positive pressure by an inert gas with respect to the pressure within the treatment chamber.

These and further objects, features and advantages of the present invention will become apparent from the following detailed description, wherein reference is made to the figures in the accompanying drawings.

DETAILED DESCRIPTION OF PREFERRED EMBODIMENTS

Figure 1:
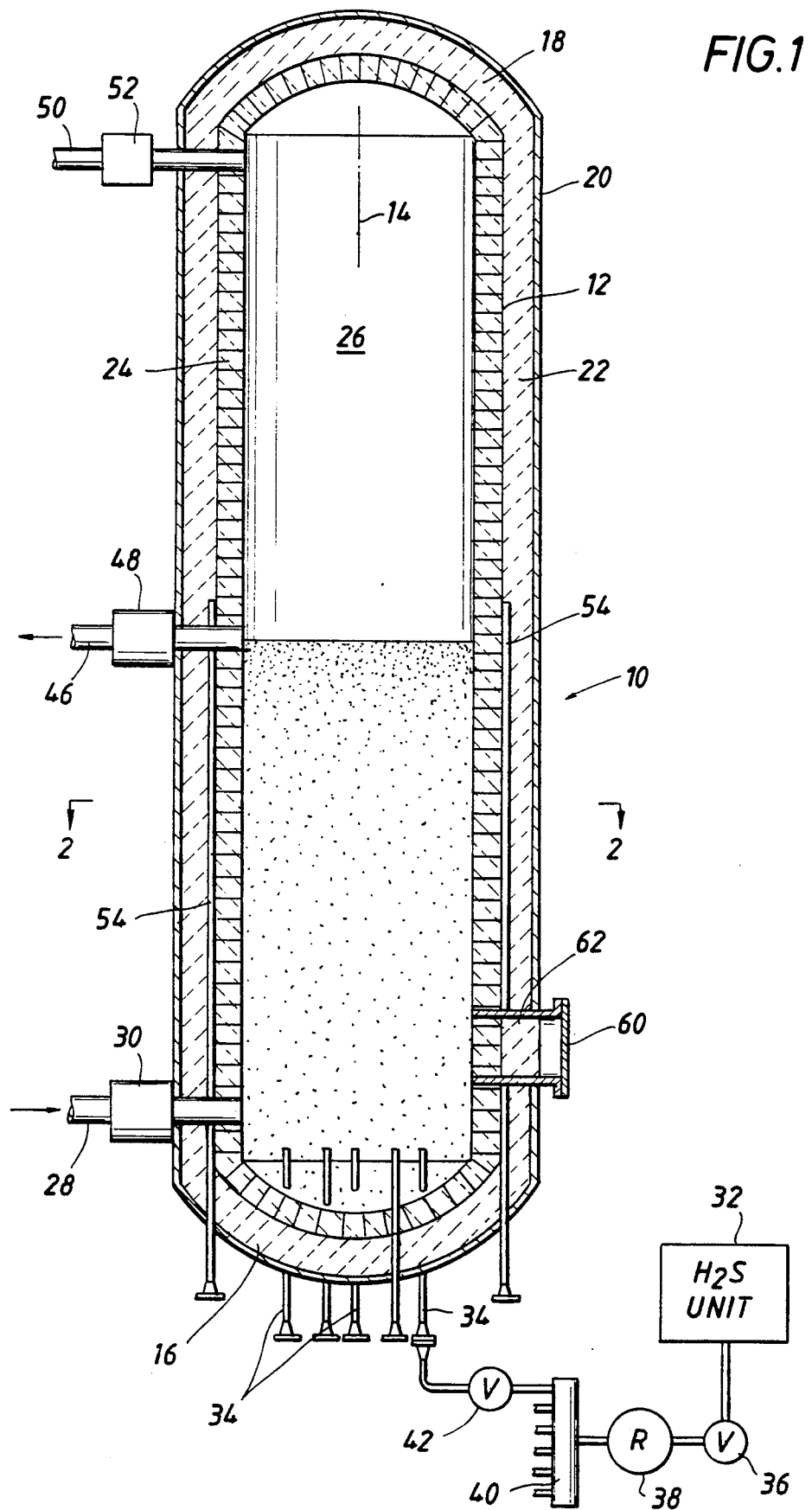
FIG. 1 is a simplified cross-sectional view of a sulfider according to the present invention for treating contaminated catalysts from a hydrocarbon cracking operation.

FIG. 1 discloses a suitable sulfider according to the present invention. The sulfider 10 may be part of a catalyst treatment facility of a catalytic hydrocarbon cracking plant, and is used for continually removing poisoned or contaminated catalyst from the cracking operation, and for returning demetalized catalyst back to the cracking operation. Sulfider 10 may be placed downstream from a nitrogen flushing unit and upstream from a chlorination unit. By contacting the poisoned catalyst at approximately 1500° F. with elemental sulfur vapors, such as $H_2S$, the metal compounds may be more easily converted to chloride form, and nickel and vanadium contaminants thereafter more easily removed by the subsequent chlorination and water washing steps. Further details with respect to the entire catalyst treatment system according to the present invention are disclosed in U.S. Pat. No. 4,686,197, hereby incorporated by reference.

Figure 2:
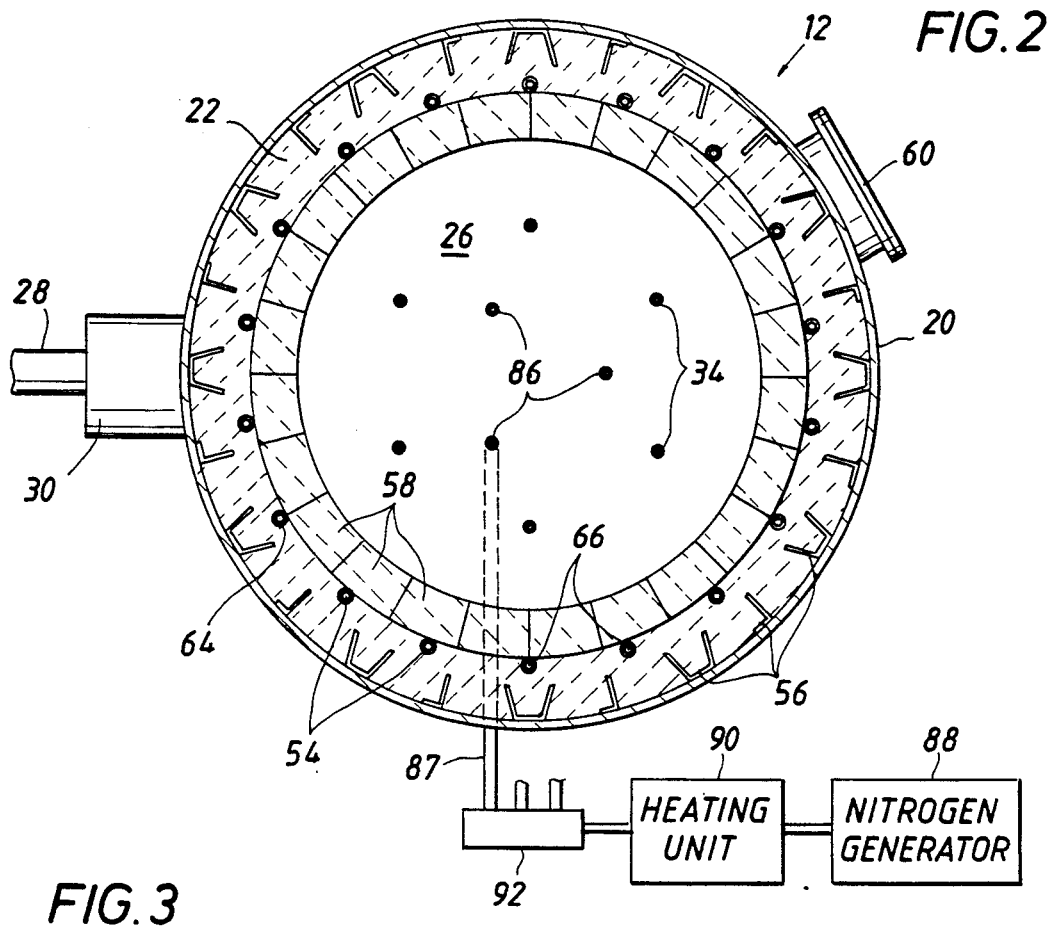
FIG. 2 is a detailed cross-sectional view along line 2—2 of FIG. 1.

Sulfider 10 comprises a generally tubular housing 12 having a vertical axis 14 and closed lower end 16 and a closed upper end 18. Referring to FIGS. 1 and 2, the housing 12 comprises an outer metal wall 20 which typically may be approximately 2.5 cm thick and of cast and/or welded construction, a first outer refractory layer 22, and a second inner refractory layer 24. The ends 16 and 18 have a construction similar to the walls of the sulfider, and accordingly the interior surface of the brick layer 24 defines a generally cylindrical treatment chamber 26. Although not shown in FIG. 1, the sulfider 10 may be mounted on a suitable base which allows for easy removal and maintenance of the $H_2S$ injection tubes and the heating rods discussed subsequently.

The poisoned catalysts at approximately 1550° F. continually enters the lower end of the sulfider via material input line 28, which is protected by insulation layer 30. Hydrogen sulfide from generation unit 32 is continually input into chamber 26 through a plurality of injection tubes 34 which each pass through the lower end 16 of the sulfider. Main valve 36, regulator 38, manifold 40, and individual injector tube valves 42 control flow of $H_2S$ into the chamber 26, and thus maintain the chamber at a desired pressure of approximately 1 to 2 psi greater than atmospheric pressure. Further details with respect to the hydrogen sulfide injection tubes are disclosed in a copending application Ser. No. 07/689978, entitled SULFIDER WITH IMPROVED INJECTORS. The layer or bed 44 of catalyst in chamber 26, particularly when subjected to pressurized $H_2S$ at the lower end of the bed, behaves substantially as a fluid at this elevated temperature, and continually flows out material output line 46 which is covered with insulation layer 48. The upper portion of the treatment chamber 26 above the bed 44 acts as a settling chamber to allow catalyst "fines" to settle by gravity back to the bed. An $H_2S$ pressure relief line 50 with conventional filter 52 prevents pressure in the chamber 26 from increasing over a selected limit, and provides a purge line for moving $H_2S$ from the chamber 26 prior to periodic sulfider maintenance operations.

During construction of the sulfider 10, elongate heating tubes 54 may be positioned circumferentially within the metal wall 20, a sleeve (not shown) temporarily placed interior of the plurality of tubes 54, and refractory layer 22 poured and cured in place. As shown in FIG. 2, various metal anchors 56 secured to the wall 20 assist in maintaining the cured refractory in place once the temporarily sleeve is removed. The tubes are positioned such that they are closely adjacent the inner surface of the refractory layer 22, with the radially inner surface of each tube being tangent with or closely adjacent the inner surface of the refractory layer 22. Alternatively, holes for each of the tubes may be drilled in the cured refractory layer 22, and the tubes 54 then inserted. Once a layer 22 has cured, the interior refractory layer 24 may be formed. Although this layer may also be poured and cured in place, it is preferable to form this layer from refractory brick 58. A conventional personnel access 60 may be built into the unit 10 to allow repair and inspection personnel to pass into and from the chamber 26 during periodic maintenance, with one of the tubes 54 being removable during this operation. Also, brick 62 may replace the poured refractory 22 for the area of the access 60, as shown in FIG. 1.

Figure 3:
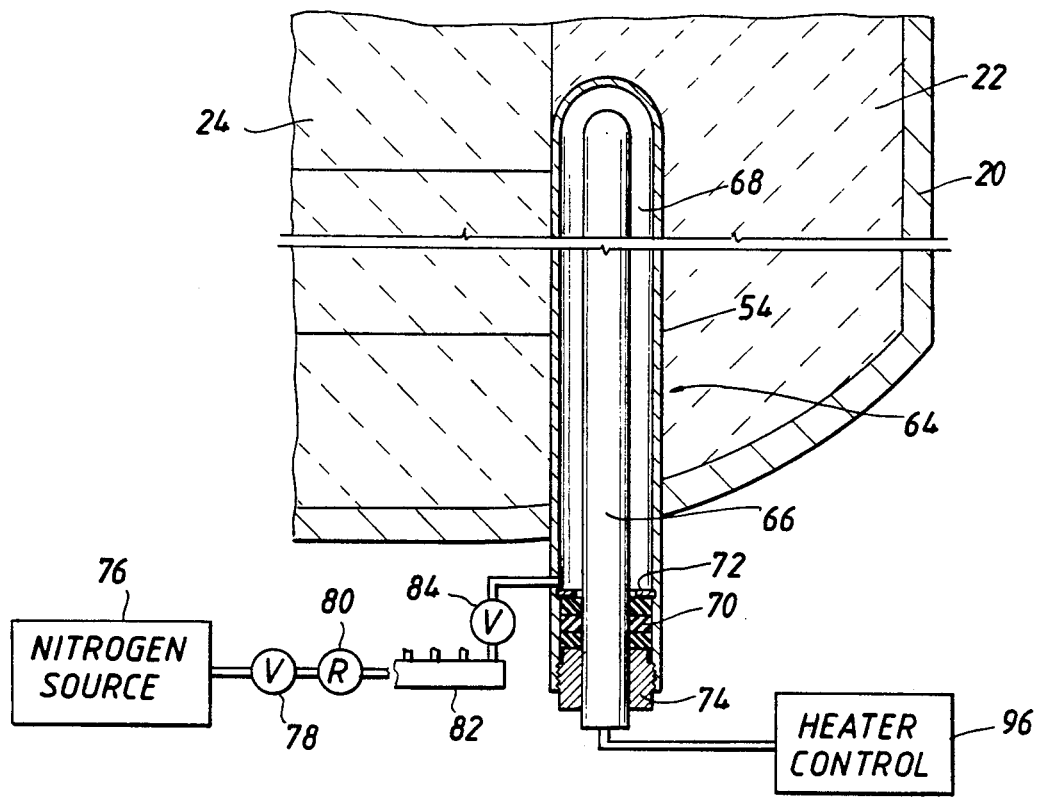
FIG. 3 is a detailed cross-sectional view of the sulfider refractory wall according to the present invention, and illustrating an alternate embodiment of one of the heating units.

As previously note, the catalyst may be input to the treatment chamber 26 at approximately 1550° F., and the inner surface of the refractory layer 24 maintained at approximately 1500° F. The circumferentially spaced heating unit 64 each comprising a heating tube 54 and an interior heating rod 66 may be operated at approximately 1300° F., so that a temperature drop of approximately only 200° F. thus exists across the brick layer 24. A conventional temperature control unit 96 as shown in FIG. 3 is provided for operating the heating units within a desired temperature range. The heating units 64 are not required to heat the catalyst chamber 26, but substantially reduce the temperature loss from the sulfider by maintaining a relatively low temperature differential across the refractory layer 24. The metal wall 20 may be maintained a relatively cool temperature of approximately 200° F., with almost all the heat loss unit 10 being the heat generated by the heating units, and not heat lost from the bed 44.

According to the design of the present invention, the overall wall thickness for the sulfider is substantially minimal, yet both the heat loss from the catalyst is minimized and the life of the sulfider substantially increased. Since the heating unit 64 are maintained at approximately 250° F. less than the temperature of the catalyst, corrosion of the metal tubes 54 is minimized. More importantly, brick layer 24 at least substantially encloses the heating units and acts as substantial gas barrier to prevent $H_2S$ gas from contacting and thus corroding the tubes 54. According to the present invention, the thickness of refractory layer 24 is selected to maintain the catalyst within the treatment chamber at least at a preselected temperature. According to the present invention, increasing the thickness of the brick layer would further reduce the heat loss from the catalyst and is thus preferred, although a layer of approximately only 15 cm is all that is required to obtain the objectives of the present invention. The refractory layer 22 at least substantially encloses the metal housing 20, and may be approximately 20 cm thick. Although the substantial temperature differential of approximately 1100° F. across this layer results in a significant heat loss, very little of this heat is lost from the catalyst and passes through the second refractory layer 24. Due to the substantially cool 200° F. temperature of the metal wall 20, as well as the combined barriers of both refractory layers 22 and 24, very little $H_2S$ contacts the wall 20, and any contact results in little corrosion because of the substantially lower temperature of the metal wall 20. If desired, a further layer of insulation may be added to the inside of metal housing 20 to reduce heat loss. The sulfider life of several years can thus be expected, thereby substantially reducing the overall sulfiding operation cost. Also, since the interior of the wall 20 is at a substantially lower temperature, the material for metal wall 20 need not be stainless steel, but rather may be a substantial less costly carbon steel.

The circumferentially spaced heating unit 64 may each comprise an elongate tube 54 embedded in the outer refractory layer 22 and an electrically powered heating rod 66 positioned within each tube. The preferred material for the tube 54 may be stainless steel, since ceramic tubes are considered quite brittle, and alumina tubes are generally considered too porous. Each tube 54 preferably has a closed upper end within the housing 12, and a lower end which extends from the housing. As shown in FIG. 3, the lower end of each heating unit 64 between tube 54 and the heating rod 66 may be sealed with a conventional packing material 70 compressed between stop washer 72 and packing nut 74. If hydrogen sulfide contacts and corrodes tube 54, the packing 70 prevents any hydrogen sulfide in annulus 68 from exiting the unit 10. Also, a nitrogen or other inert gas source 76 may be used to maintain a positive pressure in annulus 68 with respect to the pressure in the chamber 26, so that even if a pinhole in tube 54 occurs, hydrogen sulfide does not enter the annulus 68 and contact the rod 66. A primary valve 78, a regulator 80, a manifold 82, and individual heating valves 84 may thus be provided for maintaining the desired inert gas pressure in annulus 68. Various types of heating units may be provided, although electrically heated rods are preferred due to their relatively low cost, ease of maintenance, and conventional heating control.

The weight of the hydrogen sulfide added is nominal compared to the weight of the catalyst, and hydrogen sulfide may be input through six injectors 34 circumferentially and uniformly ranged about axis 14, as shown in FIG. 2. Nitrogen may be injected with hydrogen sulfide through tubes 34, but may also be injected through one or more of three different injectors 86 as shown in FIG. 2, which are not used for hydrogen sulfide injection. If desired, nitrogen gas from source of generator 88 may be passed through heater unit 90 and valve manifold 92, then transmitted by line 87 to one or more of the injectors 86. The nitrogen may be heated to substantially the temperature of the catalyst within the chamber 26 by heater 90. Flow of heated nitrogen gas to the treatment chamber may be controlled by a valve 93 within each of the lines 87, and a main valve and regulator (now shown) may also be provided.

According to the method of manufacturing a sulfider, the first refractory layer is poured and cured in place to minimize heat loss from the sulfider and to maintain the temperature of metal housing 20 at a desired low level. The thickness of this layer is primarily a function of the cost of operating the heating units to maintain their desired temperature, although the layer 22 also at least substantially encloses the metal housing to protect the housing. The desired range of operating the heating units is presumed, the approximate allowable heat loss from the treated material is know or presumed, and the thickness of the layer 24 may be determined to achieve these objectives. The material for the layer 24 may provide the desired barrier to prevent the treating fluid from contacting the heating units, although another fluid barrier separate from the refractory layer may alternatively be provided. A balance is thus achieved between the desire to operate the heating units within a selected temperature range which is ideally lower than the temperature of the catalyst input to the sulfider, and the competing desire to minimize the required thickness of the layer 24 while sufficiently reducing the heat loss from the catalyst to maintain the catalyst at the desired treatment temperature. If the thickness of layer 24 is reduced, the temperature range of operating the heating units must be increased to maintain the low level of heat loss from the catalyst. Moreover, this higher heating unit operating temperature increases the corrosion on the heating units, and the barrier effect of layer 24 is reduced as the thickness of this layer is reduced. If the thickness of layer 24 is increased, the size and thus the cost of the sulfider increases, although the heating unit operating temperature may be lowered. According to one embodiment of this invention, the sulfider heating units are operated at about 150° F. to 400° F., and preferably at about 200° F. to 300° F., less than the input temperature of the catalyst. The thickness of layer 24 is selected to achieve the desired low heat loss from the catalyst under these conditions, and the thickness of layer 22 is selected in view of sulfider construction costs and the anticipated operating costs for the heating units.

During periodic service, the unit 10 may be shut down, the hydrogen sulfide valve 36 shut off, the nitrogen line valves 93 opened, with heating unit 90 off so that nitrogen may flow out line 50 while chamber 26 is nitrogen purged of hydrogen sulfide. Access 60 may then be opened, and unit 10 may be inspected and any scale on the bottom of chamber 26 removed. Each of the electrical heating rods 66 may be removed from its respective tube 44 and replaced. According to the present invention, an individual heating rod 66 may also be replaced when the unit is operating, since sufficient heat will be provided by the remaining operating rods 66 to minimize heat loss from the catalyst and maintain the catalyst at its desired temperature, and since positive inert gas pressure may be maintained within the respective heating tube 54 by the source 76 while the rod 66 is replaced.

The selected materials for the first and second refractory layers need not be different, and these layers structurally may be a unitary layer with the outer layer functionally being the refractory material radially between the heating units and the metal housing, and the inner layer functionally being the refractory material radially between the chamber and the heating units. The general configuration of the housing need not be cylindrical, and the selected thickness of the refractory layers is less important for those portions of the sulfider which do not include heating units between the chamber and the outer metal wall.

Various changes and modifications of the sulfider not described herein will be suggested from the foregoing description. As previously noted, the concepts of the present invention are particularly well suited for an improved sulfider to treat poisoned or contaminated catalyst, but may also be used in other high temperature fluid treatment operations wherein the treating fluid is corrosive or otherwise deleterious to the unit walls at the elevated temperatures. Such changes and modifications are considered to be within the scope of the present invention, which is defined by the following claims.

What is claimed is:

1. A treatment unit comprising:
   a metal housing having a wall impervious to fluid flow therethrough and forming a chamber therein for receiving material and subjecting said material to a treating fluid, the treating fluid being highly deleterious to the metal housing at the temperature of the material within the chamber;
   a first lining refractory layer within the metal housing for minimizing heat loss from the treatment unit;
   a second lining refractory layer within the first refractory layer;
   a material input line for continually passing the material into the chamber;
   a treating fluid line for passing the treating fluid into the chamber;
   a material output line for continually passing treated material from the chamber;
   a plurality of heating units means spaced apart between an interface of the first and second lining refractory layers for substantially minimizing the temperature differential across the second lining refractory layer and thereby minimizing the heat loss from the material within the chamber; and
   a heater control unit for maintaining each of the plurality of heating unit means within a selected temperature range less than the temperature of the material input to the chamber.

2. A treatment unit as defined in claim 1, wherein:
the first lining refractory layer at least substantially enclosed within the metal housing to minimize contact of the treating fluid and the metal housing;
the second lining refractory layer at least substantially enclosed within the first refractory layer; and
the chamber has a generally cylindrical configuration.

3. A treatment unit as defined in claim 1, wherein each of the heating unit means comprises:
an elongate heater tube having a closed end within the metal housing and an open end extending outward from the metal housing;
an elongate heating rod positioned within the heater tube; and
a sealing device external of the metal housing for sealing an annulus between the heating rod and the heater tube.

4. A treatment unit as defined in claim 3, further comprising:
an inert gas source; and
an inert gas supply line in fluid communication with the inert gas source for maintaining a positive pressure within the annulus between the heater rod and the heater tube with respect to the interior chamber.

5. A treatment unit as defined in claim 1, further comprising:
the material output line being positioned above the material input line; and
the treatment fluid supply line having a discharge end below the material output line for passing treatment fluid into the chamber.

6. A treatment unit as defined in claim 1, further comprising:
an inert gas source;
an inert gas supply line in fluid communication with the inert gas source for passing inert gas into the chamber; and
a heating unit for heating the inert gas prior to being passed into the chamber.

7. A sulfider treatment unit comprising:
a metal housing forming a chamber therein for receiving contaminated catalyst from a hydrocarbon cracking operation and subjecting said catalyst at a cracking temperature to a sulfur-containing gas;
a first lining refractory layer within the metal housing for minimizing heat loss from the sulfider unit;
a second lining refractory layer within the first lining refractory layer;
a thermally insulated catalyst input line for passing the catalyst into the chamber;
a gas input line for passing the sulfur-containing gas into a lower end of the chamber;
a catalyst output line spaced above the catalyst input line for passing treated catalyst from the chamber, the interior chamber defining a bed of catalyst between the catalyst input line and the catalyst output line;
a plurality of heating unit means spaced apart between an interface of the first and second lining refractory layers for substantially minimizing the temperature differential across the second lining refractory layer and thereby minimizing the heat loss from the catalyst within the chamber; and
a heater control unit for maintaining each of the plurality of heating unit means within a selected temperature range less than the cracking temperature.

8. A sulfider treatment unit as defined in claim 7, further comprising:
the first lining refractory layer at least substantially enclosed within the metal housing; and
the second lining refractory layer at least substantially enclosed within the first lining refractory layer, the second lining refractory layer having a predetermined thickness to maintain the catalyst within the chamber at least at a predetermined temperature.

9. A sulfider unit as defined in claim 7, wherein each of the heating unit means comprises:
an elongate heater tube having a closed end within the metal housing and an open end extending outward from the metal housing;
an elongate heating rod positioned within the heater tube; and
a sealing device for sealing an annulus between the heating rod and the heater tube.

10. A sulfider unit as defined in claim 9, further comprising:
an inert gas source; and
an inert gas supply line in fluid communication with the inert gas source for maintaining a positive pressure within the annulus between the heater rod and the heater tube with respect to the interior chamber.

11. A sulfider treatment unit as defined in claim 7, wherein an outer surface of the second lining refractory layer is in engagement with an inner surface of the first lining refractory layer.

12. A sulfider treatment unit comprising:
a metal housing forming a chamber therein for receiving catalyst from a hydrocarbon cracking operation and subjecting said catalyst to a sulfur-containing gas;
a first lining refractory layer within the metal housing for minimizing heat loss from the sulfider unit;
a second lining refractory layer within the first refractory layer;
a catalyst input line for continually passing the catalyst into the chamber;
a gas input fluid line for passing the sulfur containing gas into the chamber;
a catalyst output line for passing treated catalyst from the chamber;
a plurality of heating unit means spaced apart between an interface of the first and second refractory layers for substantially minimizing the temperature differential across the second refractory layer and thereby minimizing the heat loss from the catalyst within the chamber;
the second refractory lining layer is configured for at least substantially enclosing the plurality of heating unit means to prevent the sulfur containing gas from contracting the plurality of heating unit means and;
a heater control unit for maintaining each of the plurality of heating unit means within a selected temperature range less than the temperature of the catalyst input to the chamber.

13. A treatment unit as defined in claim 12, wherein:
the first lining refractory layer at least substantially enclosed within the metal housing to minimize contact of the treating fluid and the metal housing; and
the chamber has a generally cylindrical configuration.

14. A treatment unit as defined in claim 12, wherein an outer surface of the second lining refractory layer is in engagement with an inner surface of the first lining refractory layer.

15. A treatment unit comprising:
- a metal housing having a wall impervious to fluid flow therethrough and forming a chamber therein for receiving material and subjecting said material to a treating fluid, the treating fluid being highly deleterious to the metal housing at the temperature of the material within the chamber;
- a first lining refractory layer within the metal housing for minimizing heat loss from the treatment unit;
- a second lining refractory layer within the first refractory layer;
- a material input line for continually passing the material into the chamber;
- a treating fluid line for passing the treating fluid into the chamber;
- a material output line for continually passing treated material from the chamber;
- a plurality of heating units means spaced apart along an interface of the first and second lining refractory layers for substantially minimizing the temperature differential across the second lining refractory layer and thereby minimizing the heat loss from the high temperature material within the chamber.
- an elongate heater tube having a closed end within the metal housing and an open end extending outward from the metal housing;
- an elongate heating rod positioned within the heater tube; and
- a sealing device external of the metal housing for sealing an annulus between the heating rod and the heater tube.

* * * * *